No. 877,211. PATENTED JAN. 21, 1908.
A. W. MEYER.
URN.
APPLICATION FILED NOV. 7, 1905.

4 SHEETS—SHEET 1.

Witnesses
Wm Bodge
Frank L. Seaver

Inventor
Albert W. Meyer
By his Attorney
Frank H. Ashley

No. 877,211. PATENTED JAN. 21, 1908.
A. W. MEYER.
URN.
APPLICATION FILED NOV. 7, 1905.
4 SHEETS—SHEET 2.
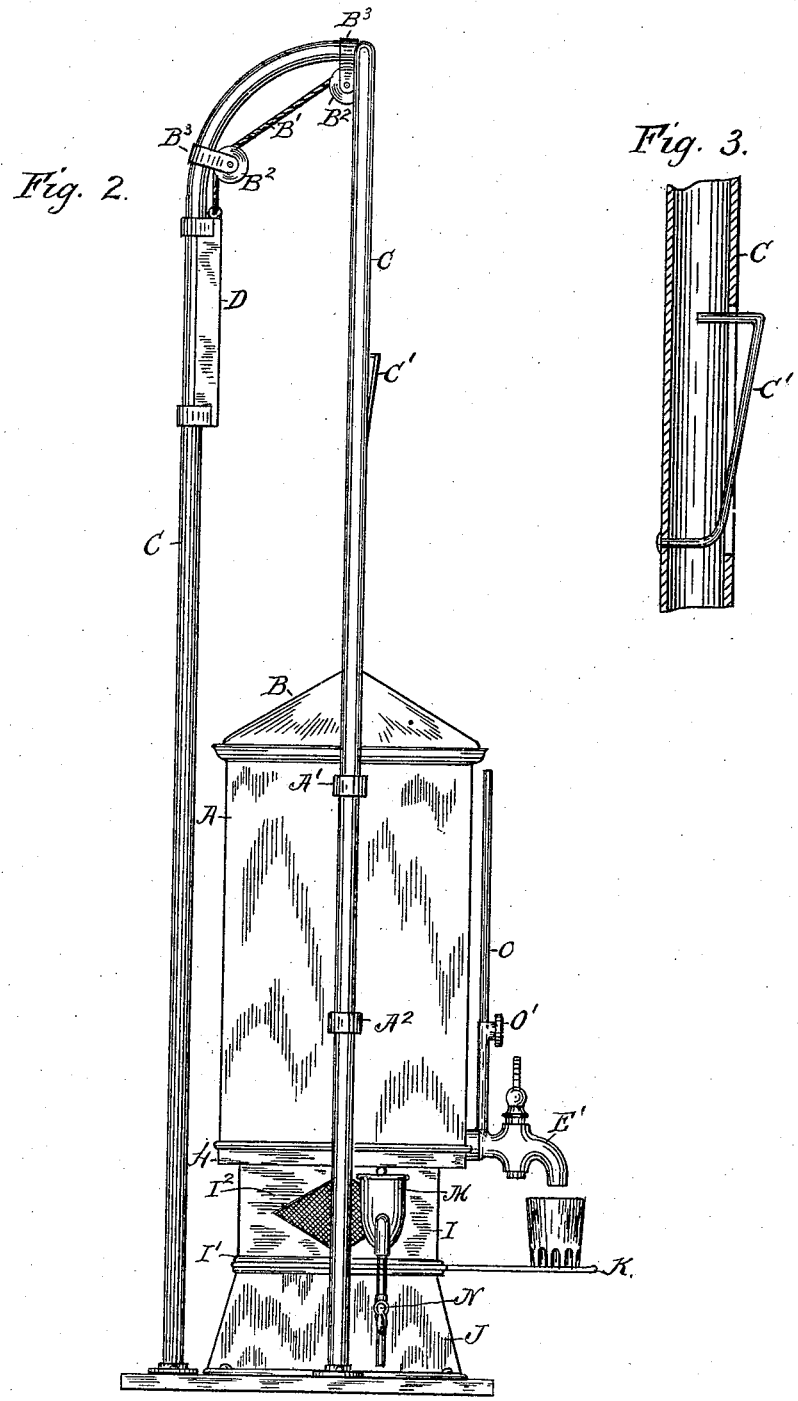
Witnesses
Wm Bodge.
Frank L. Seaver.
Inventor
Albert W. Meyer
By his Attorney
Frank W. Ashley No. 877,211. PATENTED JAN. 21, 1908.
A. W. MEYER.
URN.
APPLICATION FILED NOV. 7, 1905.

4 SHEETS—SHEET 3.

Witnesses
Wm Bodge.
Frank L. Seaver.

Inventor
Albert W. Meyer
By his Attorney

No. 877,211.

PATENTED JAN. 21, 1908.

A. W. MEYER.
URN.
APPLICATION FILED NOV. 7, 1905.

4 SHEETS—SHEET 4.

Witnesses
Wm Bodge.
Frank L. Seaver.

Inventor
Albert W. Meyer
By his Attorney
Frank W. Ashley

UNITED STATES PATENT OFFICE.

ALBERT W. MEYER, OF ROSELLE, NEW JERSEY.

URN.

No. 877,211.   Specification of Letters Patent.   Patented Jan. 21, 1908.

Application filed November 7, 1905. Serial No. 286,299.

*To all whom it may concern:*

Be it known that I, ALBERT W. MEYER, a citizen of the United States, and resident of Roselle, in the county of Union and State of New Jersey, have invented certain new and useful Improvements in Urns, of which the following is a specification.

The present invention relates to urns for use in hotels and restaurants where coffee is made in considerable quantities.

The objects of the invention is to provide an urn in which are several receptacles wherein coffee may be made and drawn for use as required and while one of said receptacles is being used as a reservoir for coffee previously made, the other may be used to make an additional supply so that fresh coffee may be dispensed at all times.

A further object is to provide an urn that is compact and durable, cheap to construct, of easily separable parts and provided with means for holding the cover and casing in suspension so that the receptacles may be easily removed for filling, cleaning etc.

A further object is to provide an urn that will be very economical in its use of gas and in which a single water compartment will suffice to furnish all the receptacles with sufficient steam to make the coffee in a proper manner.

My invention consists in the details of construction and arrangement of parts as pointed out in the claims herein.

Figure 1:
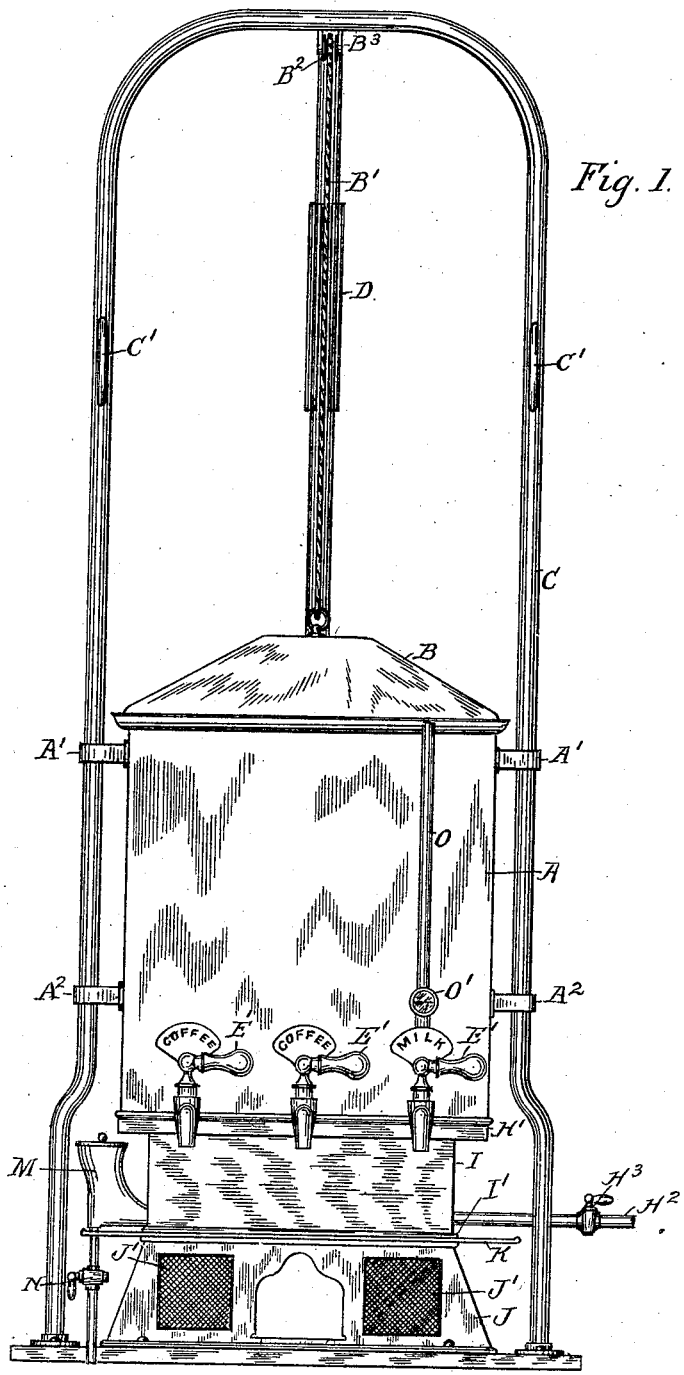
Figures 4, 5:
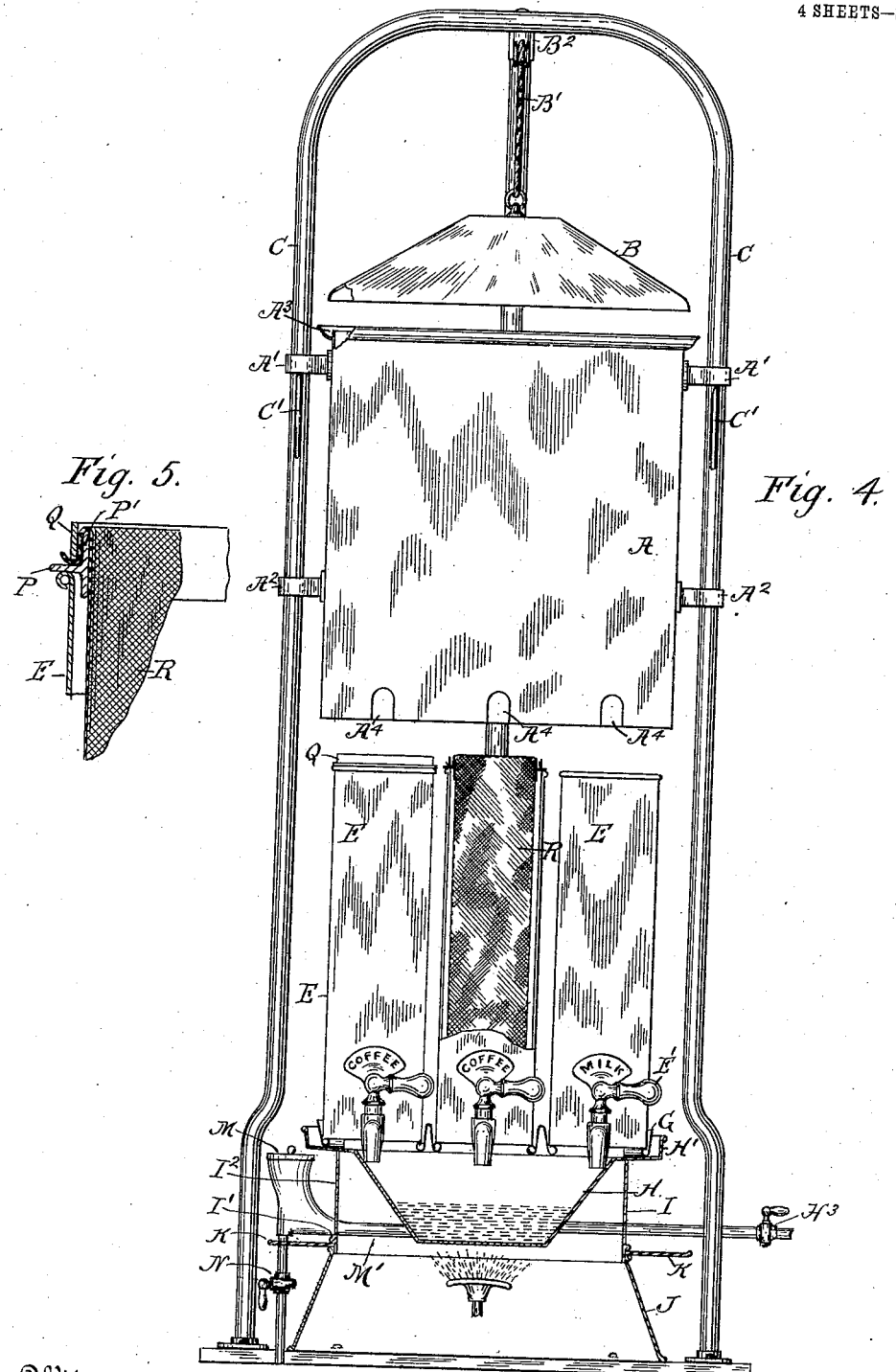
Figure 6:
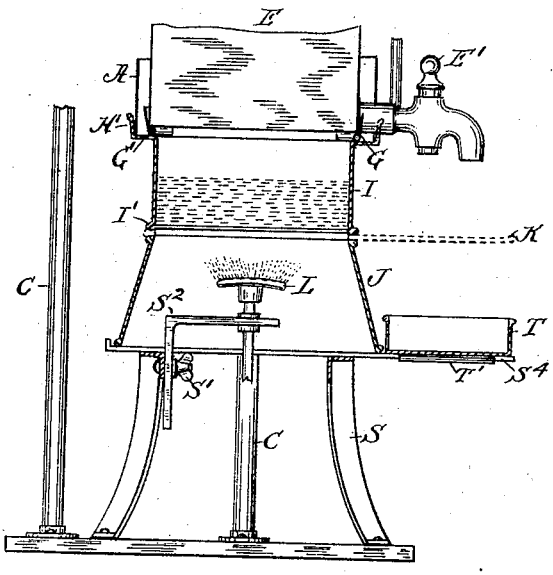
Figure 7:
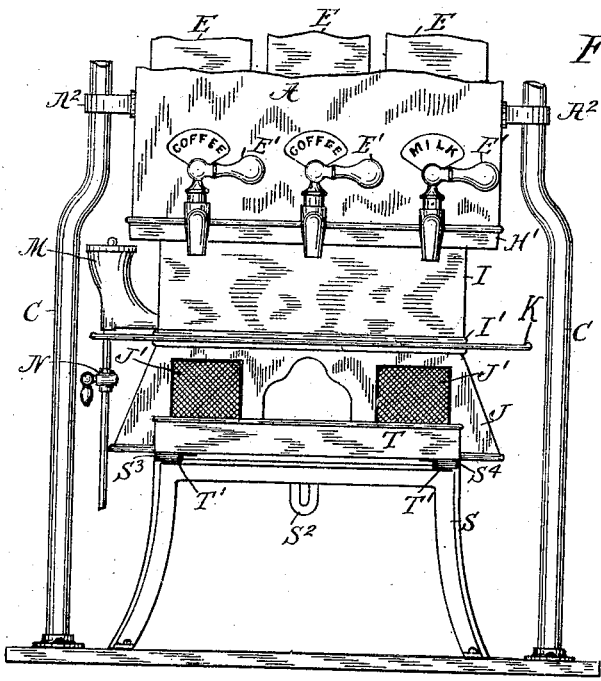

Referring to the drawings which form part of this specification, Figure 1 is a front view shown in elevation, with the casing closed, and as it appears when in condition for drawing coffee or milk therefrom. Fig. 2 is a side view of the urn and also shows the frame used for suspending the cover and casing. Fig. 3 is a sectional view of one of the tubes of the frame showing one of the spring catches which hold the casing in suspension. Fig. 4 is a front view showing the cover and casing in suspension and disclosing the separate receptacles in which the coffee and milk is heated. Fig. 5 is a detached sectional view which illustrates how the cloth bag in which the coffee is suspended in the receptacles, is held, and supported on the top of same. Fig. 6 is a side sectional view of the lower part of the urn showing the water in the water compartment, the base frame, and the adjustable means used for supporting the gas burner and Fig. 7 is a front view of the base frame with the base of the urn in position thereon.

A indicates the movable casing and B; the cover therefor.

C. indicates a frame, preferably made of metal tubing, and comprising three branches joined together at their upper ends as shown, and adapted to be secured to the counter at their lower ends. The upper part is arched and in the two side members are located spring catches $C'$ which act to support the casing A when elevated; the guide rings $A'$ depressing the catches $C'$ when brought in contact therewith, and sliding above the same, rest on the upper end of the catches when they project from the frame. A detail view of the catch is shown in Fig. 3.

The cover B is suspended by means of a rope or wire $B'$ which travels over pulleys $B^2$ which are supported by the metal straps $B^3$ which in turn are secured to the frame C by any suitable means, and at its end it is secured to a counterbalanced weight D which is adapted to slide on the rear member of the frame C, as shown.

The guides $A^2$ serve to keep the casing A in proper position on the frame, and to guide its lower edge into the overlapping rim of the base where the joint is effected.

The top of the casing is provided with a groove at $A^3$ (see Fig. 4) into which the lower edge of the cover B rests and serves to prevent the escape of steam when filled with water resulting from condensation of the steam. The outer wall of the groove $A^3$ is made higher than the inner wall so that any excess condensation will overflow into the inside of the casing and run back to the water compartment as more fully explained hereinafter.

The lower edge of the casing A is provided with openings $A^4$ which are of proper size to allow the shanks of the faucets $E'$ which are attached to the receptacles E, to project through, and closely conform to the shape of the shank, whereby steam is prevented from escaping. The front side of the rim $H'$ which surrounds the bottom edge of the casing A, is also provided with similar openings adapted to inclose the under side of the faucet up to its center, so that the casing presents a neat finished appearance and effectually prevents the escape of steam.

The receptacles E are rectangular in cross section, and rest on metal strips G, which are formed in such a manner as to raise the bottom of the receptacles above the top of the water compartment H, so that the steam may pass from the water compartment under and around said receptacles, and also allows the condensed water to flow directly back thereto. The clips G are soldered or otherwise fastened in position to the water chamber. The water compartment H may be made integral with the rectangular supporting frame I on which it rests or it may be made separate, the compartment H resting loosely on the top edge of the frame I.

The frame I is provided with a beaded rim I' near its lower edge and its lowest edge is arranged to come below the top edge of the base J, which is also provided with a beaded or overturned top, the frame I and base J fitting together as shown and holding the tray K between the said beaded edges. The tray K may be removed if desired as it is not made integral with either frame or base.

The water compartment H is formed with sloping lower sides as shown in Fig. 4, which allows the heat from the burner L to reach the water quickly and in a concentrated manner, and also provides for the escape of the products of combustion through the sides of the frame I at $I^2$ (see Fig. 2). The base J is provided with openings J' for the admission of air to supply the burner L.

The water compartment is provided with a pipe $H^2$ having a stop cock $H^3$. By connecting the pipe $H^2$ to the water main, the compartment may be filled by simply opening the cock $H^3$.

The water compartment may also be filled by pouring the water into the receptacle M, which is also connected to the water compartment by the pipe M', and the water compartment may be drained by opening the cock N as will be clearly understood.

A gage for indicating the height of coffee or milk could be used if desired, and I show one in connection with a faucet. This gage consists of a hollow tube O, open at its top end and communicating with the conduit in the faucet behind the valve therein. I provide a glass O' in the front of the tube near the bottom, so that when the coffee level falls below this glass, it will show that the receptacle is nearly empty, giving time to replenish before being exhausted.

In making coffee, a cloth bag is used in which the ground coffee is placed, and this bag is suspended in the receptacle E. I provide a frame of rectangular form which is adapted to hold the top of the bag in proper position, in the receptacle. It consists of a strap formed as shown in Fig. 5, and indicated by P, one flange of which is adapted to rest on the top of the receptacle E, and a plain band Q which overlaps the vertical flange P' and holds the top edges of the bag R firmly.

Figs. 6 and 7 illustrate a base frame S, which is adapted to support the urn and burner L. It is provided with a right angled slotted member $S^2$, one end of which is connected to the burner and is held to the frame in adjustable relation thereto by a thumb nut S'. The top of the frame S, serves as a platform for the base frame J and is provided with two projections $S^3$ and $S^4$ which coact with guides T' fitted to the under side of the tray in such a manner that the tray T may be easily removed and replaced.

By referring to the drawings it will be seen that the casing A is larger than the frame I and overhangs the same all the way around the urn. This serves a very useful purpose, as it allows the water compartment to be equal in width to the length across the bottom of the receptacles E and also keeps the heat from the burner concentrated on the water compartment so that a smaller burner may be used and thus save gas. A further advantage is that the tray K has more area with a given projection from the body of the urn and the whole appearance of the urn is more ornamental and attractive. I desire also to point out that each of the receptacles E, stand by themselves and may be removed separately, and by reason of the space between them, the steam can circulate very freely. Another point is that the products of combustion are entirely excluded from the interior of the urn and no water of condensation can reach the burner.

I prefer to make all the sheet metal parts of aluminium but they may be made of sheet iron, or brass if desired or of porcelain.

The urn is operated as follows:—Fill the water compartment by opening the cover on the receptacle M, and pouring the proper quantity therein. Light the burner and the water will soon boil and generate steam. The receptacles E are then filled with fluid as indicated by the words on the faucets, and placed in position as shown in Fig. 4. The catches C, are then depressed and the casing A lowered into engagement with the rim H'. The cover is then pulled down on to the top of the casing and will remain there as the counterweight just balances the cover and the friction of the parts is just sufficient to prevent their movement without force being applied. The steam will condense and the groove $A^3$ will fill with condensed water and form a water seal and all excess will flow back on the inside of the casing to the water compartment.

In making coffee for use in restaurants, it is desirable to have at least two receptacles for the reason that coffee should be allowed to stand for at least fifteen minutes after making, in order to allow it to settle and clarify, and in order to do this and still serve customers, one receptacle should be utilized for making while the other is used as a reservoir for immediate service.

It will be understood that the urn may be made in different forms without departing from the spirit of the invention and also that more receptacles may be added where chocolate and other beverages are desired. The frame and base J or base S could all be fastened to a wooden or metal platform and thereby make the whole device self contained so that it could be moved and installed quickly in any convenient place at a minimum of time and expense and with less liability of damage in handling.

Having thus described my invention what I claim as new and desire to secure by Letters Patent is,

1. In an urn, the combination of a water chamber open at its top and removable receptacles, the bottoms of which rest directly over the top of said water chamber, a movable casing, means for suspending said casing above said receptacles, a cover and means for suspending said cover above said casing, when the casing is elevated.

2. In an urn, the combination of a base, a water chamber supported above said base and having a contracted bottom and inclined sides and provided with a laterally extending flange at its upper end, a casing resting on said flange and movable vertically relative to said water chamber, a plurality of receptacles within said casing supported by said flange, elements located between the bottoms of said receptacles and resting on said flange for the purpose of raising said receptacles a predetermined distance above the same, a cover for said casing, a counterweight for said cover a frame comprising three branches, one of which supports the counter weight for said cover and the other two of which are provided with means for supporting said casing in an elevated position.

3. The combination in an urn, of a water receptacle having a contracted bottom, removable receptacles located above said water receptacle, means located between the top of the water receptacle and the removable receptacles to raise the bottoms of said removable receptacles above the top of the water receptacle, a frame, a casing adapted to surround said removable receptacles and to be elevated and suspended from said frame, a cover for said casing and means for suspending said cover from said frame independent of said casing.

4. In an urn, a water chamber, a casing, removable receptacles within said casing provided with faucets which project through the same, a base element J and a removable tray K held between said base element and said water chamber.

5. In an urn, a base plate, a frame secured thereto, a burner, a housing therefor secured to said base plate, a water chamber supported by said housing, and provided with a laterally extending flange at its upper end, means for filling and emptying said water chamber, a movable casing, means for supporting said casing from said frame in an elevated position, removable receptacles in said casing supported by said flange, each of which is provided with a faucet which is adapted to extend through said casing, and the bottoms of said receptacles being elevated above the top of the water chamber a sufficient distance to allow the steam to flow freely into said casing and to allow the condensed steam to flow freely to the water chamber as set forth.

6. In an urn, a water chamber having a laterally extending flange adjacent its upper edge, a removable casing supported on said flange, a plurality of removable receptacles within said casing, and a plurality of separate members resting on said flange and serving to support said receptacles above the water level, space said receptacles apart, and permit the free access of steam from said water chamber to the bottom and all sides of each receptacle.

7. In an urn, a water chamber presenting a seat adjacent its upper edge, a vertically removable casing supported upon said seat, a plurality of laterally removable receptacles within said casing, and a plurality of independent members supported by said water chamber adjacent its upper edge and constituting supports for said receptacles to hold them above the water level, space them apart, and guide them in their lateral movement.

8. In an urn, the combination of a water chamber, a casing, a receptacle within said casing and spaced therefrom and supported above the water level in said chamber, a faucet for said receptacle and extending through said casing, a base frame for supporting said water chamber, a burner within said base frame and beneath said water chamber, and a removable tray supported by said base frame and beneath said faucet.

9. In an urn, a water chamber having outwardly inclined sides and a laterally extending flange at its upper edge, a receptacle supported from said flange, a casing supported on said flange and inclosing and spaced from said receptacle, a base frame engaging with the under side of said flange but spaced from the inclined walls of said chamber and perforated adjacent its upper edge, and a burner within said base frame and beneath said water chamber.

10. In an urn, the combination of a base plate, a base frame supported thereby, a water chamber supported on said base frame, a receptacle supported above said water chamber, a casing supported by said water chamber and inclosing said receptacle, and a second frame independent of said base frame and mounted on said base plate for supporting said casing in an elevated position.

11. In an urn, the combination of a vertically removable casing, a cover therefor, a frame comprising three uprights joined together at a point above the center of the casing, means for supporting and guiding said casing on two of said uprights, and a counterweight connected to the cover and guided upon the other upright.

12. In an urn, the combination of a water chamber, means for heating the same, a receptacle supported above said chamber and subjected to the action of the steam rising therefrom, means for suspending said casing above said receptacle, a cover, and means for suspending said cover above the casing when the casing is in its elevated position.

Signed at New York city in the county of New York and State of New York, this 14th day of October A. D. 1905.

ALBERT W. MEYER.

Witnesses:
   F. M. ASHLEY,
   C. FRANK DOEBLER.